Dec. 23, 1958 W. ROTH 2,865,201
GYROSCOPIC MASS FLOWMETER
Filed Aug. 26, 1954 4 Sheets-Sheet 1
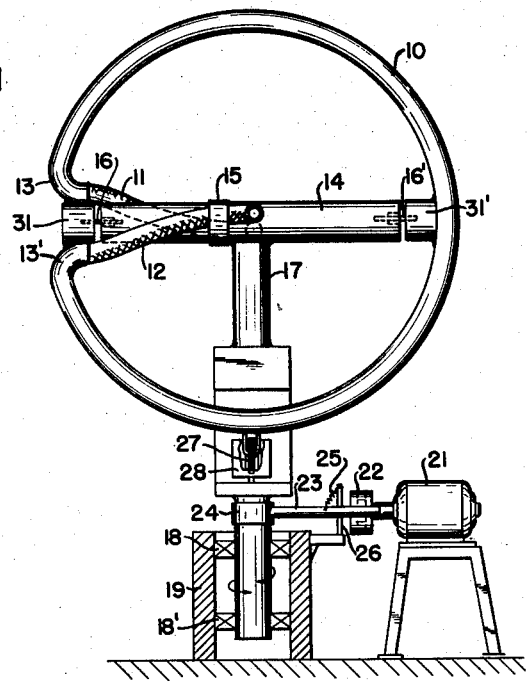
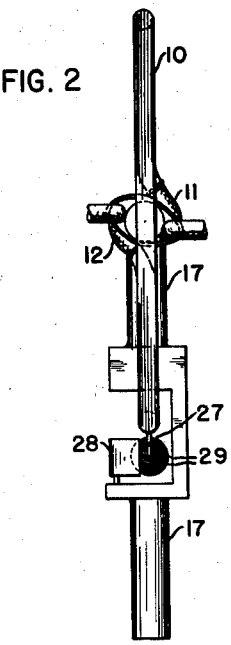
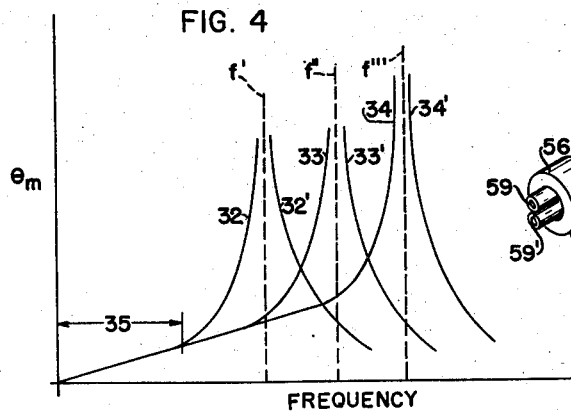
INVENTOR.
WILFRED ROTH
BY
ATTORNEYS

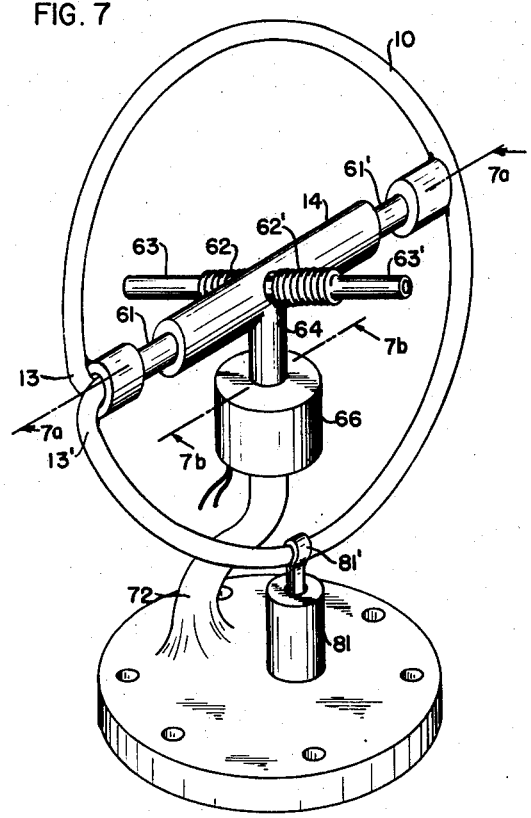

Dec. 23, 1958  W. ROTH  2,865,201
GYROSCOPIC MASS FLOWMETER
Filed Aug. 26, 1954  4 Sheets-Sheet 4
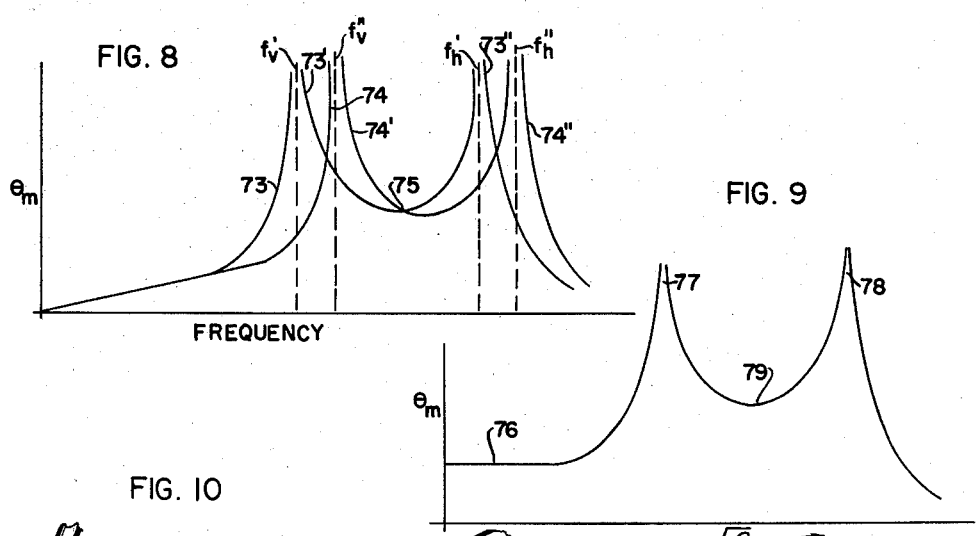
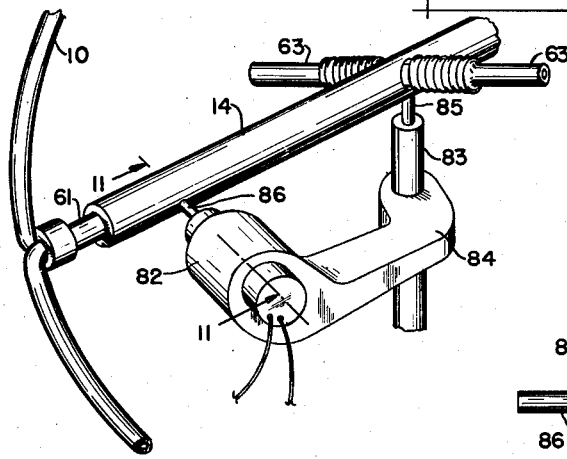
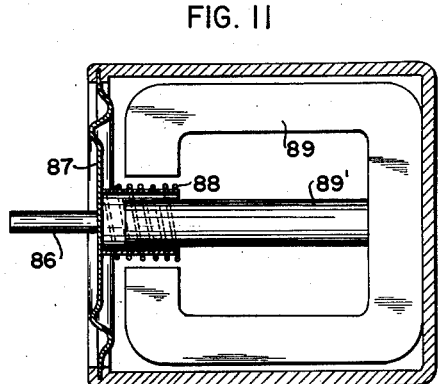
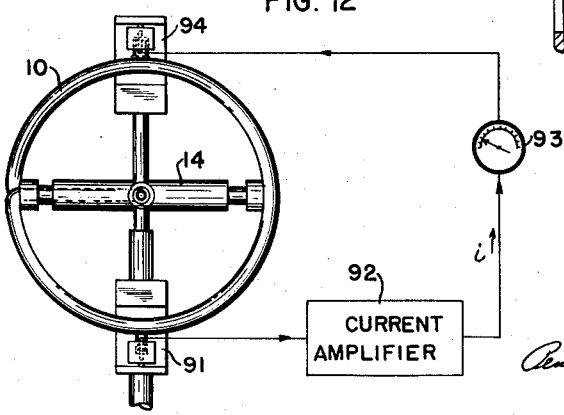
INVENTOR.
WILFRED ROTH
BY
ATTORNEYS United States Patent Office 2,865,201
Patented Dec. 23, 1958

2,865,201

GYROSCOPIC MASS FLOWMETER

Wilfred Roth, West Hartford, Conn.

Application August 26, 1954, Serial No. 452,437

30 Claims. (Cl. 73—194)

This invention relates to mass flowmeters utilizing the gyroscopic principle. The invention is especially directed to the provision of satisfactory A.-C. or oscillating flowmeters, as distinguished from those of the D.-C. or continuously rotating type, although certain features are applicable to the latter.

There is a considerable need in industry for an instrument which will measure mass flow, as distinguished from volume flow. In many industrial processes it is the mass of a reagent that is important, rather than merely volume. Also, it is often advantageous to market fluid-like materials according to their mass rather than volume. While mass flow is the product of volume flow and density, the density may vary depending upon the exact constituents of the material, and usually varies considerably with temperature. Thus the conversion of volume flow to mass flow is often difficult. Even when such conversion is possible, it is advantageous to have an instrument which indicates mass flow directly.

It has been suggested to employ the gyroscopic principle in order to measure mass flow directly. In such an instrument the fluid-like material is caused to flow in a curved conduit, specifically a conduit in the form of a loop. For a given fluid and conduit, the angular momentum varies with the rate of flow of the fluid through the conduit. By virtue of the flowing fluid, the conduit is equivalent to the rotor of an ordinary gyroscope. If the loop is caused to rotate about an axis perpendicular to that of the angular momentum, a torque will be produced about the mutually orthogonal axis. If, for example, the loop is circular and is caused to rotate about a diameter thereof by a drive source, a torque or couple will be produced about an axis mutually perpendicular to the axis of rotation and the axis of the loop. The instantaneous value of this torque will be proportional to the instantaneous value of the angular momentum as determined by the rate of mass flow of the fluid, and the instantaneous value of the angular velocity of the loop about the drive axis.

In one instrument of this general type which has been proposed, continuous rotation of the loop about one axis has been employed, and a rotating mass mounted concentrically with the axis of the loop has been driven at an angular velocity controlled by gyroscopic couples produced by the flowing liquid, but in a counter direction, so that the angular momentum of the flowing liquid is counteracted by the angular momentum of the rotating mass. This produces a null type instrument. The use of a rotating mass in this manner is considered undesirable because of the added weight and complexity involved, together with the need for careful maintenance. Furthermore, a continuously rotating loop requires sealed rotating bearings which are relatively expensive, require careful maintenance and may be troublesome with chemically active fluids or fluids at high pressure.

It has also been proposed to oscillate the loop, and employ a rotating flywheel to produce a null type instrument, as described above. While the oscillation removes the need for rotating joints, the rotating flywheel is considered highly undesirable for the reasons given above.

It is a primary object of the present invention to provide a mass flowmeter of the gyroscopic type, wherein the loop is oscillated so as to avoid the need for rotating joints, and in which the need for a rotating flywheel is avoided. An oscillating instrument is here termed the A.-C. type. Certain features of the invention, however, are applicable to a continuously rotating instrument, here termed the D.-C. type. Although the apparatus of the invention is particularly useful in measuring the mass flow of fluids, generally speaking it is capable, with suitable design parameters, of measuring the mass flow of any fluid-like material. Such materials include emulsions, slurries of solid particles in a liquid or gaseous carrier, multi-phase mixtures of liquids or gases, etc.

The invention will be explained in conjunction with the accompanying drawings, and certain features will in part be pointed out and in part be evident from the drawings and description thereof.

In the drawings:

Fig. 1 is a side view of an A.-C. mass flowmeter; Figs. 1a and 1b are details illustrating suitable damping means;

Fig. 2 is a view at right angles to that of Fig. 1;

Fig. 3 is a detail showing the arrangement of the inlet and outlet conduit sections;

Fig. 4 shows curves to explain the non-resonant operation of the apparatus of Figs. 1–3;

Fig. 6 is another embodiment of an A.-C. mass flowmeter with simplified indication;

Fig. 7 is a further embodiment of an A.-C. mass flowmeter;

Fig. 7a is a detail showing the inlet and outlet conduit sections;

Figs. 7b and 7c are details of a torque drive which may be employed with the apparatus of Fig. 7;

Figs. 8 and 9 show curves illustrating the resonant operation of the apparatus of Fig. 7;

Figs. 10 and 11 are details of an alternative form of torque drive which may be employed in the apparatus of Fig. 7; and Fig. 12 is a diagram showing a torque feedback system in accordance with the invention.

Figure 5:
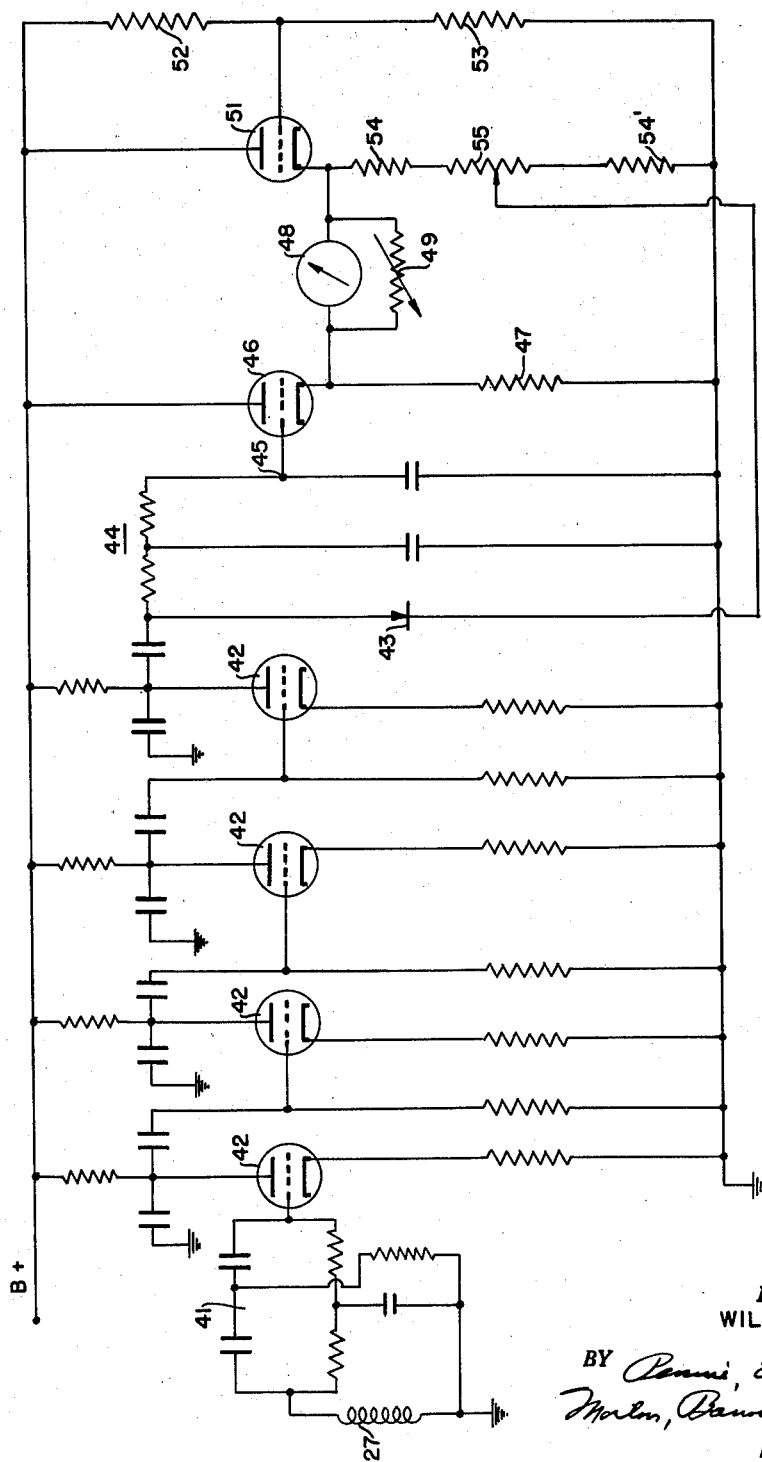
Fig. 5 is a circuit diagram of an indicating device which may be used with the apparatus of Figs. 1–3.

Referring now to Fig. 1, a fluid conduit 10 is arranged in the form of a loop and attached to support members 31, 31'. As specifically shown the loop is circular, but other configurations could be employed if desired. Inlet and outlet fluid conduit sections 11 and 12 extend from adjacent points 13, 13' of the loop to approximately the center of the loop. As here shown, conduit sections 11 and 12 are of flexible hose and secured to the horizontal support member 14 by a band 15. Or, the sections 11, 12 can be extensions of the tubing of loop 10, extending inwardly to the loop axis in the manner shown but without the restraining band 15, and flexible couplings attached to the tube sections near the center of the loop.

The loop 10 is mounted for angular movement with respect to member 14 by suitable means which are here shown as short lengths of music wire 16, 16'. Thus, the loop 10 is mounted for angular movement about an axis approximately in the plane of the loop, and the lengths of music wire form torsional springs which produce a restoring moment when the loop 10 is angularly deflected on either side of the central position illustrated.

The loop and its associated support member 14 is mounted for rotation about an axis approximately perpendicular to that of member 14 by a member 17, here shown as mounted for rotation about a vertical axis by bearings 18, 18' in a suitable housing 19. The loop 10 may be oscillated about the vertical axis by motor 21 and eccentric cam 22 bearing against a rod 23 affixed to vertical member 17 by a collar 24. Spring means 25 is attached at one end to rod 23 and at the other end to a stationary support 26 so as to hold rod 23 in engagement with eccentric cam 22. For convenience of illustration, the point at which the spring 25 is attached to support 26 is shown lying above the rod, but in practice it will be understood that the point of attachment will ordinarily be substantially on a line with rod 23. While an eccentric cam is specifically illustrated, any other suitable means for oscillating the loop about the vertical axis may be employed.

Since a constant frequency of oscillation at the selected frequency of operation is desirable for accuracy, motor 21 is advantageously of the synchronous type. Other types may of course be employed if due care is taken to assure constant speed under existing operating conditions.

In operation, fluid is supplied to the loop through one of conduit sections 11, 12 and led away from the loop through the other section. In flowing through loop 10, the mass of the fluid creates an angular momentum which is proportional to the rate of mass flow of the fluid. When the loop is rotated about the vertical axis, a torque is developed about the horizontal axis of member 14 which is proportional to the vector product of the instantaneous value of the angular momentum and the instantaneous value of the angular velocity about the vertical axis. Both of these quantities have direction as well as magnitude. Hence if the direction of fluid flow or angular velocity is reversed, the resulting torque will be reversed. With a sinusoidal oscillation, as provided by the drive motor 21 and cam 22 in Fig. 1, the resulting torque will also be sinusoidal.

The movement produced by this torque is restrained by music wires 16, 16' and hence the loop 10 oscillates about the horizontal axis at the frequency of the vertical oscillation and with an amplitude proportional to the rate of mass flow.

A transducer is associated with the loop which is sensitive to gyroscopic couples produced by the loop about the horizontal axis of 14. As here illustrated, the transducer is of the velocity type so as to yield an output proportional to the angular velocity of the loop about the axis of 14. In the form illustrated, a coil 27 is attached to the loop 10 and a portion thereof moves in an air gap of magnet 28. The magnet may be of the permanent type or magnetized by a suitable field coil. Connections 29 to the coil are provided so that the electric potential induced in the coil as the position of the coil in the magnetic field varies may be supplied to an indicating instrument.

Although many types of transducers to measure displacement or its time derivatives, or stresses, strains and the like, can be employed, such as resistance wire strain gauges, magnetostrictive strain gauges, piezoelectric strain gauges, differential transformers, etc., those of the velocity type are preferred at the present time.

In a structure of the type described, the maximum or peak angular displacement of the loop from its central position varies with the rate of mass flow. Also, the angular acceleration of the loop is a maximum at maximum displacement. If a transducer is employed which is responsive to either displacement or acceleration, the peak instantaneous values of the output will occur when the loop is at its maximum excursion from the zero or neutral position. This varies with each value of rate of mass flow. Consequently, if an output linear with rate of mass flow is desired, the peak displacement of the loop must be linear over the desired range of mass flow measurements. This may be difficult to achieve in practice since any non-linearity in the restoring moment of torsional springs 16, 16' or non-linearities elsewhere in the system will impair the linearity of the transducer output.

On the other hand, the angular velocity of the loop is a maximum as the loop passes through the zero or neutral position. Consequently, if a transducer responsive to the velocity of the loop is employed, the peak instantaneous values of the output will always be produced at the same point in the oscillating arc of the loop, namely, at the zero position thereof, regardless of the rate of mass flow therethrough. Thus, the effect of non-linearities in the oscillatory motion of the loop is greatly reduced or entirely eliminated.

A velocity-type transducer or pick-up is particularly advantageous when combined with a peak detector circuit. An example of such a circuit will be described hereinafter in connection with Fig. 5.

An important aspect of the present invention lies in the arrangement of the conduit sections for leading fluid to and from the loop. Among the advantages of the arrangement provided is that of preventing so-called Coriolis forces from affecting the accuracy of measurement.

When a pipe or conduit containing a flowing fluid is subjected to angular movement transverse to its axis, the walls of the pipe must exert a force on the flowing fluid to impart angular acceleration thereto. This is known as Coriolis force. The force varies with rate of mass flow of the fluid in the pipe, and in an apparatus of the type herein considered would introduce an error unless the force is eliminated or the apparatus designed so that the force does not affect the output.

In the apparatus of Fig. 1, conduit section 11 rotates about the drive axis 17 and hence, when fluid is flowing outwardly from the center, a Coriolis force is present which is substantially in a plane perpendicular to the drive axis (horizontal plane as specifically illustrated) and creates a torque about the drive axis. Similarly, a Coriolis force is present due to fluid flow in conduit section 12, but since the fluid flow is inwardly toward the center, the force and resulting torque about the drive axis opposes that of conduit 11. Hence, the effects of the two Coriolis forces substantially cancel and do not affect the output indication.

In the arrangement of Fig. 1 a constant velocity drive source is employed, that is, a drive source whose angular velocity is relatively unaffected by the load thereon. In this case it is not essential that the Coriolis forces cancel, so long as they are effective only about the drive axis, since only an additional load would be imposed on the drive source and the output would be unaffected. This is accomplished in Fig. 1 by leading fluid to and from the loop 10 by conduits substantially parallel to and closely adjacent the horizontal axis 14 about which the loop moves to produce an output signal, that is, the output axis of rotation. This relationship is helpful in the event that perfect cancellation of Coriolis forces is not obtained by the parallel counterflow feed. Rotation of the feed lines by 90° is of course possible with a close parallel counterflow arrangement, or where the unbalance in Coriolis force is sufficiently small for the intended application.

An added feature is that by connecting the inlet and outlet conduit sections 11, 12 to external pipe lines, etc., from points near the intersection of the axes of vertical member 17 and horizontal member 14, and by providing flexibility in the conduit sections near the intersection of the axes, any restraint in the freedom of the loop to oscillate due to the connections to the external pipe line, etc. is reduced to a very small or negligible amount, since the moment arm about the center of rotation is small. In Fig. 1 this is accomplished by employing flexible tubes or conduit sections 11, 12 and providing substantially right angle bends in the sections, as shown in Figs. 2 and 3. Fig. 7, to be described hereinafter, shows an alternative arrangement to the same end. In both figures, the loop structure can be dynamically balanced by adding or removing weight from member 14 on the opposite side of the vertical axis from the conduit sections.

In an arrangement such as shown in Fig. 1, the loop 10 has a natural resonant frequency of oscillation about the axis of member 14 due to the moment of inertia of the loop and the restoring moment provided by torsional springs 16, 16′. In accordance with well-known principles of mechanics, the moment of inertia of the loop 10 will include not only the mass and configuration of the conduit itself, but also the mass and location of any members associated therewith such as the pickup coil 27 and the inwardly projecting supports 31, 31′. Also, any stiffness of the conduit sections 11, 12 must be taken into account along with the stiffness of the torsional springs 16, 16′. Furthermore, the natural resonant frequency of the loop 10 will be affected by the mass of the fluid contained therein. While the volume of the fluid is essentially fixed for a given instrument, the effective mass of the loop when filled with fluid will vary with the density of the fluid.

It has been found very important to select properly the frequency of oscillation of the loop about the vertical axis with respect to the natural resonant frequency of the loop about the horizontal axis in order to obtain an accurate indication of mass flow when metering fluids of varying density, or to meter fluids of different density without changing calibration. In accordance with one aspect of the invention, it is contemplated to oscillate the loop at a frequency which is low compared to the natural resonant frequency of the loop.

The curves of Fig. 4 will be helpful in understanding this condition of operation. Fig. 4 shows three sets of curves 32, 32′, 33, 33′ and 34, 34′ for fluids of different density. Frequency of oscillation is plotted along the horizontal axis and peak angular displacement $\theta_m$ about axis of 14 is plotted for the vertical axis. The conditions plotted are for equal rates of mass flow.

Analysis of a system such as that shown in Fig. 1 indicates that the displacement $\theta$ can be represented approximately by the following equation:

$$\theta = \frac{1}{g} \frac{dW}{dt} \left[ \frac{2\pi R^2 \varphi \omega}{k_x \left(1 - \frac{\omega^2}{\omega_x^2}\right)} \right] e^{i\omega t} \qquad (1)$$

where $\theta$ = angular displacement in radians of loop 10 about axis of 14.

$g$ = acceleration of gravity
$W$ = pounds of material flowing across any cross-section
$t$ = time in seconds
$R$ = radius of the loop in feet
$\varphi$ = maximum angular displacement of loop 10 about axis of 17 due to the constant velocity driving source in radians
$\omega$ = angular velocity of the constant velocity driving source in radians/sec.
$k_x$ = spring constant of the constraint about the torque axis 14 in lb.-ft./radian.
$\omega_x$ = natural resonant angular velocity of the loop 10 about the torque axis 14.

The maximum or peak angular displacement, $\theta_m$, is given by Equation 1 when $e^{i\omega t} = 1$.

This analysis indicates, as will be noted from Equation 1, that the maximum angular displacement of the loop 10, when driven by a constant velocity source such as motor 21, varies linearly with the driving angular velocity $\omega$ regardless of the value of density at low driving frequencies where the quantity $$\frac{\omega^2}{\omega_x^2}$$

is small compared to unity. This is the region 35 shown in Fig. 4. Frequency, rather than angular velocity, is plotted in Fig. 4 since it is the quantity commonly measured, it being understood that frequency is $$\frac{1}{2\pi}$$

times angular velocity.

When the driving frequency approaches the natural resonant frequency $f'$ of the loop for a liquid of given density, a very large increase in displacement is obtained, as shown by curves 32, 32′. In Fig. 4 damping has been neglected so that curves 32, 32′ would intersect at infinity. In any practical system, damping is of course present and will affect the shape of the curves. If the driving frequency is increased appreciably beyond the natural resonant frequency, the displacement $\theta_m$ drops off inversely with frequency.

With a fluid of lower density, similar curves will be obtained but the natural resonant frequency will lie at a higher frequency such as shown at $f''$ in Fig. 4. For a fluid of still lower density the natural resonant frequency will be still higher, as indicated at $f'''$.

As above mentioned, in accordance with one feature of the present invention it is contemplated applying a driving frequency which will be sufficiently low compared with the natural resonant frequency of the loop when filled with fluid of density within a predetermined range so that the apparatus will operate within the region 35 indicated in Fig. 4.

For a given selected frequency in this range, i. e., for $$\frac{\omega^2}{\omega_x^2}$$

small compared to unity, Equation 1 indicates that the maximum angular displacement will be proportional to the mass flow.

The selection of a particular operating frequency will, of course, depend upon the design parameters of the apparatus and the range of fluid densities over which it is desired to employ the instrument. It will be understood that a portion of the moment of inertia of the loop structure will be that due to the material of which the loop is constructed, and the remainder will be contributed by the mass of the fluid therein. Thus, only a fraction of the total moment of inertia will be subject to change by variations in fluid density. The torque per se about the axis of member 14 will be unaffected by the moment of inertia of the loop structure, since it is a function of rate of mass flow through the loop. However, the displacement of the loop about the axis of member 14, and the resulting angular velocity and acceleration, will be affected by the moment of inertia of the loop structure. Thus with a pickup transducer sensitive to one of these quantities, the greater the fixed component of inertia, the less the output of the transducer will be affected by changes in the fluid density. Of course, it is not desirable to make the loop structure too massive, since the sensitivity of the instrument will be reduced or more amplification required, more driving power will be required, and greater acceleration forces will be encountered.

For a given field of use, the variation in density of liquids likely to be encountered is not so great as to preclude the selection of a proper driving frequency which will give accurate indications and adequately high output signal.

It has been mentioned that damping inherent in any practical system will affect the shape of the curves of Fig. 4. Where desired, damping can be introduced intentionally so as to increase the frequency range of region 35. Such damping can be introduced at 16, 16′ by inserting viscous material, by employing dash pots between loop 10 and the vertical member 17, by employing electrical damping such as eddy current damping, etc. These and many other forms of damping are well known in the art.

Illustrative of the foregoing, Figs. 1a and 1b show eddy current and viscous damping, respectively. In Fig. 1a an electrically conductive metal plate 96 is secured to loop 10 and arranged to oscillate in the field of a magnet 97 which may be of the permanent magnet type or energized by a suitable coil. Magnet 97 is stationary with respect to member 14 and is attached thereto by support member 98. As the conductive plate 96 moves in the field of magnet 97, eddy currents are created in plate 96 and damp the movement of the loop 10. Advantageously the plate 96 is mounted on loop 10 diametrically opposite the transducer coil 27 (Fig. 1) so as to lie in a plane perpendicular to the plane of the loop and passing through the axis of vertical member 17, as shown.

In Fig. 1b a plate 99 is attached to the loop 10 in a manner similar to plate 96 of Fig. 1a. In this figure, the plate 99 is arranged to oscillate in a container 101 filled with a viscous liquid, such as a viscous oil, and the container is attached to member 14 similar to magnet 97 in Fig. 1a. As plate 99 moves back and forth, it will shear the viscous liquid and hence dissipate energy.

While variations in the displacement $\theta_m$ with mass flow may be measured by a suitable transducer and used to indicate mass flow, as above pointed out it is advantageous to employ a velocity-type transducer. The output of such a transducer will be proportional to the time rate of change of $\theta$ rather than $\theta$ directly.
Thus:

$$V = kR' \frac{d\theta}{dt}$$

where
$V$ = voltage output of the transducer
$k$ = a constant dependent on design of the transducer
$R'$ = distance of the pickup from the axis 14 of rotation Curves similar to Fig. 4 may be drawn which indicate the variation in output with velocity-type pickups by differentiating Equation 1 and plotting the results, exclusive of the factor $e^{j\omega t}$. Although the shape of the curves will differ from those shown in Fig. 4, the conclusion as to the operating region described above will be evident therefrom.

The amplitude of oscillation in an apparatus like that of Fig. 1 can be made quite small. For example in one specific construction of an instrument designed to measure relatively low rates of mass flow, up to 10 pounds per minute, the amplitude of oscillation about the vertical axis was ±0.5 degrees. For a full-scale mass flow of 10 lbs./min. the maximum displacement of the loop about the horizontal axis was approximately ±0.005 degree. The loop radius was 3.5", the operating frequency was 10 cycles/second and the natural resonant frequency of the loop was 100 cycles/second. A relatively simple velocity pickup gave sufficient output for convenient amplification and indication by a circuit similar to that shown in Fig. 5.

Referring now to Fig. 5, a circuit is shown for receiving the output of apparatus such as shown in Fig. 1, and giving a direct indication of rate of mass flow on a suitably calibrated meter. In Fig. 5 coil 27 is that shown in Figs. 1 and 2 and supplies a voltage proportional to rate of mass flow to the circuit. A rejection filter 41 is advantageously employed to reject any 60-cycle power line frequencies. As here shown, it is of the so-called "twin T" type, but of course any suitable form of filter can be employed. The voltage variations from input coil 27 are amplified in stages including tubes 42. Any suitable low frequency amplifier design can be employed, that shown being found satisfactory. Such amplifiers are well-known in the art so that detailed description is unnecesssary.

The output of the last amplifier stage is supplied to a rectifier 43, here shown as the crystal type. The rectifier is connected as a peak detector and the output filtered by suitable R-C filter 44. The output of the filter circuit at point 45 thus consists of a D.-C. or slowly varying A.-C. wave corresponding to the peak values of the signal in coil 27. If the rate of mass flow is constant, a constant D.-C. value will be obtained at 45, and as the rate of mass flow varies the voltage at point 45 will likewise vary.

The detector output at point 45 is supplied to a thermionic vacuum tube 46 connected as a cathode follower, and the voltage across cathode resistor 47 is supplied to one terminal of a micro-ammeter 48. Ammeter 48 may be shunted by a variable resistance 49 for calibration purposes. In order to make the indicator insensitive to line voltage variations and also to provide for setting the zero of meter 48, another tube 51 is provided which has its anode energized from the same B+ source as tube 46, and its grid supplied with a constant positive bias from the same B+ source through the voltage divider resistors 52, 53. The cathode circuit of tube 51 includes resistors 54, 54' and potentiometer 55 whose total resistance is advantageously approximately equal to that of resistor 47. The other side of meter 48 is then connected to the cathode of tube 51. The lower terminal of rectifier 43 is returned to a variable tap on potentiometer 55, as shown, so that an adjustable D.-C. bias can be applied to the rectifier.

Before making a measurement of mass flow, the zero of meter 48 can be set by adjusting the arm of potentiometer 55. This impresses a positive bias on the grid on tube 46 through rectifier 43 and the resistance of filter 44. The bias is so adjusted that the difference in potential between the cathodes of tubes 46 and 51 results in sufficient current through meter 48 to bring the pointer to the zero setting. Thereafter the position of the pointer will vary with the rate of mass flow. Meter 38 may be calibrated in arbitrary units or directly in terms of rate of mass flow for a given instrument.

As before pointed out, it is advantageous in a mass flowmeter such as shown in Fig. 1 to employ a transducer of the velocity type which gives voltage peaks at the neutral axis which are proportional to rate of mass flow. Thus, the effect of possible non-linearities in the oscillation of the fluid conduit loop are relatively unimportant. Since the indicator of Fig. 5 employs peak detection, the meter 48 is sensitive only to variations in the peak amplitude of the applied wave and variations in the instantaneous voltage between peaks are unimportant. Thus, with relatively simple instrumentation an accurate indication of rate of mass flow is obtainable.

The circuit arrangement of Fig. 5 is given merely as an example of a suitable arrangement employing peak detection which has been found satisfactory in practice. However, many other circuits are known in the art employing peak detection and any suitable form can be employed if desired. Also, with adequate linearity in the oscillation of the fluid conduit loop, or with transducers other than those of the velocity type, other forms of detectors can, of course, be employed.

If the integrated mass flow is desired, rather than the instantaneous rate of mass flow, a suitable form of integrating indicator can be employed in place of meter 48. For example, a watt-hour meter with one coil connected in place of meter 48 and the other coil energized from a constant voltage source could be employed.

For less stringent applications the displacement of the loop may be indicated directly, as by means of a pointer, rather than employing a pickup transducer and associated circuitry such as described above.

Fig. 6 illustrates such an arrangement, together with a loop and mounting arrangement which, although not possessing all the advantages of that shown in Fig. 1, may nevertheless be employed in some applications. Here the loop 10 is mounted for rotation about a diameter thereof by bearings 56, 56' carried by a U-shaped frame 57. Frame 57 is mounted for rotation about an axis perpendicular to that of bearings 56, 56' by shaft 58 rotating in bearing housing 58'. The loop may be oscillated about the axis of 58 in the same manner as in Fig. 1.

Instead of employing inlet and outlet conduit sections leading toward the center of the loop, in Fig. 6 they lead outwardly, as shown at 59, 59'. Advantageously sections 59, 59' are connected in a fluid pipe line by flexible connections. It will be noted that the counterflow of fluid in parallel sections 59, 59' results in cancellation of Coriolis forces, so that such forces are substantially ineffective about either axis.

In place of a torsional spring arrangement, elastic bands 60, 60' provide a restoring moment for the loop about the axis of bearings 56, 56'. A pointer 70 is attached to the loop and a scale 70' associated therewith, so as to indicate displacement of the loop about the axis of bearings 56, 56' as a result of mass flow therethrough.

Referring now to Fig. 7, a more refined loop structure is shown which has certain advantages over that shown in Fig. 1. Also, a different type of driving means is illustrated in order to enable the apparatus to operate in a different manner, as will be described in connection with Figs. 8 and 9.

In Fig. 7, the conduit 10 is supported by member 14 in a manner generally analogous to that shown in Fig. 1. However, instead of employing torsional springs of music wire, in Fig. 7 short sections of thin-walled tubing 61, 61' are provided. Sections 61, 61' function as torque tubes or torsional springs which allow the loop 10 to rotate within a limited range about the axis of 14, and provide a restoring moment. The adjacent ends 13, 13' of loop 10 are bent to form sections 60, 60' (Fig. 7a) and pass through the hollow supporting structure to the center of the loop. At the center the sections are bent at right angles in opposite directions and flexible connections 62, 62' provide for connection to external pipe lines, the latter being represented by short pipe sections 63, 63'.

This loop structure is simple and mechanically reliable. Also, it has the advantage that the radial sections 60, 60' of the conduit are parallel and closely adjacent to the axis of member 14. As in the case of Fig. 1, the Coriolis forces due to flow in sections 60, 60' are in opposite directions, and the structure of Fig. 7 permits an even more perfect cancellation. This loop structure can, of course, be used in the apparatus of Fig. 1 in place of that shown.

The driving source shown in Fig. 7 is of the so-called constant torque type, that is, the torque is substantially constant regardless of load. As specifically shown, it comprises a rotor structure having a central vertical support 64 and poles 65 of permanent magnet material, such as Alnico. A corresponding stator structure 66 surrounds the rotor and includes cooperating poles 67 about which suitable energizing coils 68 are wound. The coils are connected together in series or parallel, as design considerations require, and terminate in leads 69 supplied from a suitable source of A.-C. current. A section 71 of reduced diameter is provided between the rotor section 65 and the base 72 to which section 66 is secured. Section 81 functions as a torque rod or tube allowing limited rotation of the rotor and the loop structure mounted thereon, while providing a restoring moment. Thus, if A.-C. current is supplied to the stator, the loop structure will be oscillated about a vertical axis and, with fluid flowing through the loop, the loop will simultaneously oscillate about its horizontal axis. The resulting peak angular displacement of the loop about the horizontal axis will vary with the rate of mass flow.

It will be noticed that the loop 10 will have a natural resonant period of oscillation about the axis of member 14 in a manner similar to that described in connection with Fig. 1. In addition, the structure of Fig. 7 provides a restoring moment about the vertical axis so that the loop and its supporting structure 14 and 64 will also have a natural resonant frequency of oscillation about the vertical axis. This enables the apparatus of Fig. 7 to be employed in a different mode of operation than described in connection with Figs. 1 and 4.

From Equation 1 it will be noted that if the operating frequency $$\left(\frac{\omega}{2\pi}\right)$$

is below the natural resonant frequency of the loop about the horizontal axis of 14

$$\left(\frac{\omega_x}{2\pi}\right)$$

a decrease in resonant frequency due to increased fluid density will result in an increased angular displacement of the loop ($\theta$). On the other hand, if the operating frequency is above the natural resonant frequency of the loop, a decrease in resonant frequency due to increased fluid density will result in a smaller angular displacement of the loop. With a constant torque drive source and a restoring moment about the vertical axis, such as shown in Fig. 7, similar statements can be made with respect to the amplitude of oscillations ($\varphi$ in Equation 1) about the vertical axis. If the operating frequency is below the vertical resonant frequency, an increase in fluid density will result in an increase in $\varphi$ and hence an increase in angular displacement of the loop, $\theta$, and vice versa.

Since the moments of inertia and spring constants of the system about the vertical axis can be made different from those about the horizontal axis, the natural resonant frequencies about the two axes can be made different. Then, by selecting an operating frequency intermediate the two resonant frequencies, an increase in fluid density will tend to increase the amplitude of oscillation about one axis and decrease it about the other. These two effects will tend to counteract each other, yielding an output relatively independent of change of density over a limited range.

The functioning can be developed mathematically from Equation 1 by introducing the following equation for the maximum angular displacement about the vertical axis, $\varphi$:

$$\varphi = \frac{T}{k_y\left(1 - \frac{\omega^2}{\omega_y^2}\right)} \quad (2)$$

where
$T$ = peak torque of the constant torque driving source.
$k_y$ = spring constant of constraint about the drive axis (vertical).
$\omega_y$ = natural resonant angular velocity of the system about the drive axis (vertical).

If Equation 2 is introduced into Equation 1, the following is obtained:

$$\theta = \frac{1}{g}\frac{dW}{dt}\left[\frac{2\pi R^2 T \omega}{k_x k_y\left(1 - \frac{\omega^2}{\omega_x^2}\right)\left(1 - \frac{\omega^2}{\omega_y^2}\right)}\right]e^{j\omega t} \quad (3)$$

Since the denominator contains the product of two resonance terms, it is evident that there are two frequencies of operation at which very large amplitudes will be obtained, infinite in the case represented by Equation 3 in which no damping is assumed. Also, it is apparent that if $\omega$ is between $\omega_x$ and $\omega_y$, a change in the latter due to change in fluid density will alter the values of the two resonance terms in opposite directions so as to tend to maintain the product constant.

The mode of operation will perhaps be clearer by reference to the curves of Figs. 8 and 9.

In Fig. 8 curve 73, 73', 73" represents the maximum angular displacement $\theta_m$ of the apparatus of Fig. 7 for a fluid of given density as a function of driving frequency. If the natural resonant frequency of the loop about the horizontal axis is different from that about the vertical axis, two resonant response peaks will be obtained, as shown. In Fig. 8 it is assumed that the resonant frequency about the horizontal axis is higher, as shown by dotted line $f_H'$. The natural resonant frequency about the vertical axis is indicated by dotted line $f_V'$. Similar curves 74, 74', 74'' are shown for a fluid of less density but the same rate of mass flow. Since the total quantity of fluid within the conduit 10 has less mass, the resonant frequencies will be higher, as indicated at $f_V''$ and $f_H''$.

It will be observed that there is a region near the point 75, where the curves intersect, over which the displacement $\theta_m$ varies only slightly with change of frequency. Therefore, if the operating frequency is selected to lie in the region of point 75, variations in density which cause a shifting of the curves from right to left, or vice versa, will not greatly affect the accuracy of the instrument.

Fig. 9 illustrates the situation in a different manner. In this figure the operating frequency is assumed to be fixed and displacement $\theta_m$ is plotted against the square root of density, $\rho$. As is evident, when the density is such that the natural resonant frequencies are well removed from the operating frequency, the displacement is practically independent of density. This is the horizontal region 76. However, in the regions 77, 78, where the natural resonant frequency of the loop about one or the other of its axes coincides with the operating frequency, the displacement varies greatly with the density. There is a region intermediate the resonant peaks, on either side of point 79, where the displacement varies only slightly with variations in density. Thus, for a limited range of fluid densities, it is possible to employ a driving frequency which is intermediate the natural resonant frequencies of the loop about horizontal and vertical axes, and still obtain a displacement which is comparatively independent of the density for a given value of mass flow.

In some cases the proper operating frequency is subject to calculation. For example, if the moments of inertia about vertical and horizontal axes are equal, and the different resonant frequencies about these two axes are obtained by different restoring moments or spring constants, it can be shown that the minimum at point 79 in Fig. 9 occurs when the square of the drive frequency equals the average of the squares of the two resonant frequencies. In general, the resonant frequencies used in the calculation would be those obtaining when the fluid has the expected density. Then, as the density changes over a limited range, only a small second-order error is introduced. With different moments or inertia about the two axes, although the same analytical approach applies, the mathematics become more complicated, and an empirical determination of the proper operating frequency may be simpler.

In calculating the curves of Figs. 8 and 9 it has been assumed that all of the mass in the loop consists of the fluid contained therein. In a practical case there will be considerable fixed mass in the loop and hence the curves in the region of points 75 or 79 will be considerably flatter than those shown. In designing an instrument for use under this mode of operation, the proportioning of mass between fixed mass and fluid mass can be selected with respect to the range of densities over which it is desired to have the apparatus operate, so as to give a desired degree of accuracy.

The curves of Figs. 8 and 9 also disregard damping. As stated in connection with Fig. 1, such damping is always present to some degree and can be introduced intentionally to flatten the resonant peaks and give a wider range of operation. In addition to damping about the horizontal axis 14 as described for Fig. 1, in Fig. 7 damping can also be introduced for movement of the loop structure about the vertical axis. With damping about both axes, both resonant peaks are flattened.

The separation of the natural resonant frequencies can also be chosen to suit particular requirements. In general, a greater separation gives a greater operating range for a given degree of accuracy, but a lower output, and vice versa. As damping is increased, the separation can be made less while preserving the degree of accuracy, although at the expense of some decrease in output.

If the damping is made sufficiently great, it is possible to make the natural resonant frequencies about the two axes the same, and select the operating frequency to equal the natural resonant frequencies when the loop is filled with fluid of the expected density. Then, as the density varies over a limited range, the error in measurement of mass flow will be small. For operation over a given range of densities, the error can be reduced by employing more damping to further flatten the resonant peaks, although the output of the instrument will be reduced. Thus the design can be altered to meet the requirements of a given application.

An important advantage of the mode of operation illustrated in Figs. 8 and 9 is that a considerably greater output for a given rate of mass flow is obtainable. This simplifies subsequent instrumentation. Also, in general it is possible to employ higher operating frequencies and thus the response time of the instrument under conditions of variable flow is reduced.

An output may be derived from the movement of the loop in the apparatus of Fig. 7 by means of a suitable transducer 81 with the movable element thereof 81' attached to the loop. The transducer may be of the velocity type such as described in connection with Fig. 1, or any other suitable type, as explained above. The output of the transducer may be supplied to a suitable indicator. For example, the arrangement shown in Fig. 5 may be employed. Since the output of the flowmeter under the resonant condition of operation is in general greater than under the non-resonant condition, less amplification will ordinarily be required and simpler forms of instrumentation may be employed.

Figs. 10 and 11 illustrate an alternative form of constant torque drive which may be used with the apparatus of Fig. 7. In Fig. 10 the torque driving source 82 is rigidly mounted on the vertical support 83 by an arm 84. A section 85 of reduced diameter, acting as a torsional spring, allows the horizontal support member 14, bearing the loop 10, to rotate within a limited range about the vertical support 83 and provides a restoring moment. The driving source 82 has the driving rod 86 affixed to horizontal support member 14.

As shown in Fig. 11, driving rod 86 is carried by a diaphragm 87 analogous to the diaphragm of a loudspeaker. A coil 88 is attached to diaphragm 87 and moves in the field of a magnet 89, 89'. Conveniently, the center pole of the magnet structure 89' can be made a permanent magnet, and the remaining portions 89 may be of magnetic material, such as iron.

The structure is analogous to that of a moving coil loudspeaker, and when A.-C. current is supplied to coil 88, driving rod 86 is caused to oscillate and drives the support member 14 with the associated loop 10 at a frequency equal to that of the A.-C. current.

As pointed out hereinbefore, an important feature of the invention is the employment of a torque-type drive with the flowmeter operating under the resonant condition described in connection with Figs. 8 and 9. While two new forms of suitable torque drives have been described, other forms may of course be employed, if desired. In connection with the non-resonant condition of operation described in connection with Fig. 4, a velocity-type of drive is advantageous, as previously discussed. It is possible to employ a torque drive source with apparatus designed to operate under the non-resonant condition by employing a spring constant sufficiently stiff so as to convert the initial torque drive source into an essentially constant velocity source. This may be accomplished by making the torsional spring section 71 of Fig. 7b, or 85 of Fig. 10, very stiff. This results from the fact that with a stiff spring constant in the vertical supporting structure, the displacement of the loop resulting from the application of a given torque will be substantially constant and independent of the moment of inertia about the vertical axis.

The above-described specific embodiments may be termed "open-cycle" systems since the displacement of the loop varies with rate of mass flow, and an output is obtained which is proportional to the displacement, velocity or acceleration thereof. The overall response of such an instrument depends upon linearity and stability of the components in the amplifier, and of the means employed for indicating the output. It is possible to design the apparatus to operate in a so-called "closed-cycle" system where the need for very precise measurement of rate of mass flow warrants. This may be accomplished without resorting to cumbersome rotating masses to counteract the angular momentum of the flowing liquid.

Fig. 12 illustrates such a closed-cycle system. In Fig. 12 only the loop 10 and immediately associated structures are illustrated, it being understood that the detailed structure may follow that shown in Fig. 1, or that of Fig. 7 modified to employ a constant velocity drive source. The output of the transducer 91 is supplied to an amplifier 92 of the so-called constant current type, which supplies an output current proportional to applied voltage regardless of variations in the load. The output of amplifier 92 is passed through a suitable current-actuated meter 93 to a driving device 94 which applies driving force to the loop 10 on the opposite side of a diameter thereof from the pick-up transducer 91. Electrical connections to 94 are made in such polarity that the torque produced opposes that due to gyroscopic action of the flowing fluid.

Driving device 94 is a transducer which converts an electrical current into a mechanical force. Any suitable transducer can be employed. As specifically shown, driving device 94 is similar to the pickup transducer 91. The actual design would ordinarily be somewhat different, since transducer 91 would usually develop only very small currents, whereas driving device 94 should be capable of handling much larger currents. These considerations will be understood by those skilled in the art.

The system may be analyzed in the following manner. Let $T_1$ be the peak torque produced in loop 10 about the axis of member 14 by gyroscopic action of a fluid flowing therethrough.
Then, $$T_1 = k_1 \frac{dW}{dt} \qquad (2)$$

where $k_1$ is a constant and W is as given in connection with Equation 1. The driving device 94 exerts a force on the loop which, when multiplied by the radius, gives a resultant peak torque $T_2$. This torque will be proportional to the peak current $i$ supplied to the driving device. Since only limited movements are required, it will be assumed that the torque varies linearly with current. This gives the following equation:

$$T_2 = k_2 i \qquad (3)$$

Obviously, if the torque $T_2$ is not linear with current over the operating range, the constant $k_2$ can be replaced by a suitable non-linear parameter. If V is the peak voltage output of transducer 91 and G is the gain of amplifier 92, the current can be expressed as:

$$i = GV \qquad (4)$$

Assuming a constant-frequency driving source for oscillating the loop and associated structure about the vertical axis, the voltage output of the transducer 91 can be represented as:

$$V = k_3 \theta_m \qquad (5)$$

In Equation 5, $k_3$ is a constant depending upon the detailed design. It will be understood that Equation 5 will apply not only to pickup transducers responsive to displacement, but will also apply to pickups of the velocity or acceleration type, since the driving frequency is assumed constant and hence V is proportional to $\omega\theta$ for a velocity pickup or is proportional to $\omega^2\theta$ for an acceleration pickup.

Since the actual deflection of coil 10 about the axis of member 14 is proportional to the net torque about the axis, the following relationship obtains:

$$\theta_m = k_4(T_1 - T_2) \qquad (6)$$

By substitution of Equations 2 through 5 in Equation 6, the following equation can be obtained:

$$\theta_m = \frac{k_1 k_4 \frac{dW}{dt}}{1 + k_2 k_3 k_4 G} \qquad (7)$$

By suitable design of the system, and particularly the gain of the amplifier 92, $k_2 k_3 k_4 G$ may be made very large compared to unity. Then the denominator of Equation 7 is substantially $k_2 k_3 k_4 G$ and the equation becomes:

$$\theta_m = \left(\frac{k_1}{k_2 k_3 G}\right) \frac{dW}{dt} \qquad (8)$$

By substituting Equation 8 in Equation 5 and thence in Equation 4, the output current from the amplifier may be expressed as:

$$i = \frac{k_1}{k_2} \frac{dW}{dt} = K \frac{dW}{dt} \qquad (9)$$

This indicates that the current from amplifier 92 flowing through meter 93 is directly proportional to rate of mass flow, and meter 93 can be calibrated to indicate mass flow either in pounds per unit time or in arbitrary units. For an otherwise fixed design, the greater the gain of amplifier 92 the more closely the current through meter 93 will indicate the true rate of mass flow, and the gain can be selected to give the desired degree of accuracy in accordance with the ratio of the two terms in the denominator of Equation 7. Also the greater the gain, the smaller $\theta_m$ becomes for a given rate of mass flow. This is because the net torque on the loop $(T_1 - T_2)$ becomes smaller compared to the torque due to gyroscopic action $(T_1)$.

It will be noted that the amplitude of oscillation of the loop 10 in the arrangement of Fig. 12 can be made extremely small with sufficient gain in amplifier 92, so that non-linearities in the oscillating structure become quite negligible. It is desirable to apply the counteracting torque from driving source 94 at a point along the vertical axis in the arrangement shown, so that the resultant torque will not affect motion about the drive axis and produce an error. It should be also noted that the measurement of mass flow in the arrangement of Fig. 12 is independent of the characteristics of the amplifier 92 so long as the gain is large enough. Therefore a very stable system is obtainable.

It will be noted that in this system a true null is not obtained, since this would require infinite gain. Nevertheless, only a very small error in measurement is incurred so long as $k_2 k_3 k_4 G$ is large compared to unity.

A further advantage of the system of Fig. 12 lies in the fact that with a constant velocity drive source, the driving frequency can be selected without regard to resonant or non-resonant conditions of operation discussed in connection with Figs. 1 and 7. It will be understood that $k_1$, $k_2$ and $k_3$ in Equations 2, 3 and 5 are independent of resonance or non-resonance of the loop structure about axis 14. However, $k_4$ in Equation 6 is a true constant only when the operating frequency is well below the natural resonant frequency of the loop as discussed in connection with Fig. 1. However, when the gain of the amplifier is sufficiently high that $k_2 k_3 k_4 G$ is large compared to unity, $k_4$ cancels out as shown by Equations 8 and 9. Thus $i$ is independent of fluid density for a given rate of mass flow regardless of the frequency of the constant velocity drive source.

This freedom in selection of operating frequency is often valuable, since higher frequencies in general yield a more rapid response under changing rates of mass flow. Also, velocity or acceleration type pickups have higher sensitivity at higher frequencies, thus requiring less amplification.

As in the case of the apparatus of Figs. 1 and 7, mass flow can be indicated by indicators of the integrating type in place of the simple meter 93 in Fig. 12. For example, the current $i$ can be supplied to the current coil of a watt-hour meter, to a motor driven counter, etc. These and many other forms of integrating circuits and devices are well known, and may be employed as suit the conditions of a particular application.

It will be understood that amplifier 92 of Fig. 12 has been shown and described as a constant current amplifier since driving transducer 94 is of the current actuated type. While this arrangement is preferred, it is possible to employ a driving transducer which is essentially voltage actuated, in which case amplifier 92 may be of the constant voltage type, that is, of the type yielding an output voltage substantially independent of load variations. In such case meter 93 can be a voltmeter shunted across the amplifier output circuit, or other suitable indicators including those of the integrating type can be employed. The mathematical treatment given above will apply to this modification if the voltage $v$ supplied to the driving transducer is substituted for current $i$ in Equations 3, 4 and 9.

While conventional vacuum tube amplification has been shown in Fig. 5, and may be employed in amplifier 92 of Fig. 12, other forms of amplifiers such as magnetic amplifiers, transistor amplifiers, etc. can be employed where suitable for a particular application.

The specific embodiments illustrated have essentially single-turn loops. It is possible to employ multiple-turn loops if desired.

In the specific embodiments described herein, electric motors or other types of electrically actuated driving sources have been described. There are a great many types of electrically actuated driving sources known, and suitable alternatives may be employed in place of those shown. Also, when the application makes it desirable, non-electrical driving sources such as those of the pneumatic or hydraulic type, etc. may be used.

Various indicating means have been described in connection with the specific embodiments, ranging from a simple pointer mounted on the loop to various types of transducers and associated circuitry. It will be understood that the fundamental manifestation of the gyroscopic effect due to flow of fluid through the loop is a couple or torque, but the torque usually causes an angular movement of the loop. This angular movement may be measured, as described, by a pointer or by transducers responsive to displacement or time derivatives thereof such as velocity or acceleration. The torque can be measured more or less directly, as by strain gauges, but even then at least a small movement of the loop is required to produce an output.

Although a number of modifications of the specific embodiments have been mentioned hereinbefore, it will be understood by those skilled in the art that many other modifications are possible within the spirit and scope of the invention, and that features of one embodiment may be incorporated in another to fit a particular application.

I claim:

1. A mass flowmeter of the gyroscopic type which comprises a fluid conduit of loop form, means mounting said loop for angular movement about an axis approximately in the plane of the loop, means mounting said loop for angular movement about an axis approximately perpendicular to the first-mentioned axis, substantially parallel inlet and outlet fluid conduit sections connected to adjacent points of said loop, whereby fluid is led to and from said loop in substantially parallel and opposite directions, means for imparting angular movement to said loop about one of said axes, said one axis being at an angle to an axis about which angular momentum exists due to fluid flow in said loop to produce gyroscopic action, and indicating means sensitive to gyroscopic couples of said loop about the other of said axes for indicating mass flow through the loop, said parallel inlet and outlet fluid conduit sections having a component of angular movement about at least one of said axes as said loop moves during flowmeter operation.

2. A mass flowmeter of the gyroscopic type which comprises a fluid conduit of loop form, means mounting said loop for angular movement about an axis approximately in the plane of the loop, means mounting said loop for angular movement about an axis approximately perpendicular to the first-mentioned axis, substantially parallel and closely adjacent inlet and outlet fluid conduit sections connected to adjacent points of said loop, whereby fluid is led to and from said loop in substantially parallel and opposite directions, said conduit sections being substantially parallel to and closely adjacent one of said axes, means for imparting angular movement to said loop about one of said axes, the last-mentioned axis being at an angle to an axis about which angular momentum exists due to fluid flow in said loop to produce gyroscopic action, and means for indicating movement of said loop about the other of said axes, said parallel inlet and outlet fluid conduit sections having a component of angular movement about at least one of said axes as said loop moves during flowmeter operation.

3. A mass flowmeter of the gyroscopic type which comprises a fluid conduit of loop form, means mounting said loop for angular movement about an axis approximately in the plane of the loop, means mounting said loop for angular movement about an axis approximately perpendicular to the first-mentioned axis, said axes substantially intersecting centrally of said loop, substantially parallel inlet and outlet fluid conduit sections extending from said loop to approximately the intersection of said axes and arranged so that fluid flow in one section is in the opposite direction with respect to said intersection from fluid flow in the other section, means for imparting angular movement to said loop about one of said axes, said one axis being at an angle to an axis about which angular momentum exists due to fluid flow in said loop to produce gyroscopic action, and indicating means sensitive to gyroscopic couples of the loop about the other of said axes for indicating mass flow through the loop.

4. A mass flowmeter of the gyroscopic type which comprises a fluid conduit of loop form, means mounting said loop for angular movement about a first axis approximately in the plane of the loop, means mounting said loop for angular movement about a second axis approximately perpendicular to said first axis, said axes substantially intersecting centrally of said loop, inlet and outlet fluid conduit sections extending from closely adjacent points of said loop near said first axis to approximately the intersection of said axes, whereby fluid flow in said conduit sections is substantially in opposite directions and generally parallel to said first axis, flexible conduit connections to said conduit sections near said intersection for leading fluid to and from said conduit sections, means for imparting angular movement to said loop about said second axis, said second axis being at an angle to an axis about which angular momentum exists due to fluid flow in said loop to produce gyroscopic action, and indicating means sensitive to movement of said loop about said first axis.

5. A mass flowmeter of the gyroscopic type which comprises a substantially circular fluid conduit loop, means mounting said loop for angular movement about a first axis along substantially a diameter of the loop, means mounting said loop for angular movement about a second axis substantially perpendicular to said first axis, said axes intersecting at substantially the center of said loop, inlet and outlet fluid conduit sections extending to said loop from approximately the center thereof and substantially parallel to said first axis and closely adjacent thereto, the inner ends of said conduit sections having substantially right angle bends mutually perpendicular to said first and second axes and in opposite directions, flexible conduit connections to said right angle bends closely adjacent the center of said loop, means for imparting angular movement to said loop about said second axis, said second axis being at an angle to an axis about which angular momentum exists due to fluid flow in said loop to produce gyroscopic action, and indicating means sensitive to movement of said loop about said first axis.

6. A mass flowmeter of the gyroscopic type which comprises a fluid conduit of loop form, means mounting said loop for angular movement about a first axis approximately in the plane of the loop, said means including an elongated support member extending across said loop and attached to the loop at opposite ends thereof, at least portions of said support member being of sufficiently small cross-sectional area to allow torsional rotation thereof while providing a restoring moment, means mounting said support member for angular movement about a second axis approximately perpendicular to said first axis, said axes substantially intersecting centrally of said loop, at least the portion of said support member between the intersection of said axes and one end thereof being hollow and containing inlet and outlet fluid conduit sections for said loop, flexible conduit connections to said conduit sections near said intersection for leading fluid to and from said conduit, means for imparting angular movement to said loop about said second axis, said second axis being at an angle to an axis about which angular momentum exists due to fluid flow in said loop to produce gyroscopic action, and indicating means sensitive to movement of said loop about said first axis.

7. A mass flowmeter of the gyroscopic type which comprises a fluid conduit of loop form, means mounting said loop for angular movement about an axis approximately in the plane of the loop, means mounting said loop for angular movement about an axis approximately perpendicular to the first-mentioned axis, inlet and outlet fluid conduit sections for said loop arranged substantially parallel to one of said axes, driving means of the substantially constant velocity type for oscillating said loop about the other of said axes, said other axis being at an angle to an axis about which angular momentum exists due to fluid flow in said loop to produce gyroscopic action, and indicating means sensitive to movement of said loop about said one axis.

8. A mass flowmeter of the gyroscopic type which comprises a fluid conduit of loop form, means mounting said loop for angular movement about a first axis approximately in the plane of the loop, means mounting said loop for angular movement about a second axis approximately perpendicular to said first axis, said axes substantially intersecting centrally of said loop, inlet and outlet fluid conduit sections for said loop arranged substantially parallel to said first axis, driving means of the substantially constant velocity type for oscillating said loop about said second axis, said second axis being at an angle to an axis about which angular momentum exists due to fluid flow in said loop to produce gyroscopic action, and indicating means sensitive to movement of said loop about said first axis.

9. A mass flowmeter of the gyroscopic type which comprises a fluid conduit of loop form, means mounting said loop for angular movement about an axis approximately in the plane of the loop, means mounting said loop for angular movement about an axis approximately perpendicular to the first-mentioned axis, substantially parallel inlet and outlet fluid conduit sections connected to adjacent points of said loop, whereby fluid is led to and from said loop in substantially parallel and opposite directions, driving means for oscillating said loop about one of said axes, said one axis being at an angle to an axis about which angular momentum exists due to fluid flow in said loop to produce gyroscopic action, the mounting means for angular movement of the loop about the other of said axes including means providing a restoring moment, and means for indicating angular movement of the loop about said other axis, said parallel inlet and outlet fluid conduit sections having a component of angular movement about at least one of said axes as said loop moves during flowmeter operation.

10. A mass flowmeter of the gyroscopic type which comprises a fluid conduit of loop form, means mounting said loop for angular movement about an axis approximately in the plane of the loop, means mounting said conduit for angular movement about an axis approximately perpendicular to the first-mentioned axis, said axes substantially intersecting centrally of said loop, inlet and outlet fluid conduit sections extending from said loop to approximately the intersection of said axes, said conduit sections being substantially parallel to said first axis and arranged so that fluid flow in one section is in the opposite direction with respect to said intersection from fluid flow in the other section, driving means for oscillating said loop about said second axis, said second axis being at an angle to an axis about which angular momentum exists due to fluid flow in said loop to produce gyroscopic action, and indicating means sensitive to movement of said loop about said first axis.

11. A mass flowmeter of the gyroscopic type which comprises a fluid conduit of loop form, means mounting said loop for angular movement about a first axis approximately in the plane of the loop, said means including an elongated support member extending across said loop and attached to the loop at opposite ends thereof, at least portions of said support member being of sufficiently small cross-sectional area to allow torsional rotation thereof while providing a restoring moment, means mounting said support member for angular movement about a second axis approximately perpendicular to said first axis, said axes substantially intersecting centrally of said loop, at least the portion of said support member between the intersection of said axes and one end thereof being hollow and containing inlet and outlet fluid conduit sections for said loop, flexible conduit connections to said conduit sections near said intersection for leading fluid to and from said conduit sections, driving means for oscillating said loop about said second axis, said second axis being at an angle to an axis about which angular momentum exists due to fluid flow in said loop to produce gyroscopic action, and transducer means connected with said loop to yield an output which varies with angular movement of the loop about said first axis for indicating mass flow through the loop.

12. A mass flowmeter of the gyroscopic type which comprises a fluid conduit of loop form, means for leading fluid to and from said loop, means mounting said loop for angular movement about an axis approximately in the plane of the loop, means mounting said loop for angular movement about an axis approximately perpendicular to the first-mentioned axis, driving means for oscillating said loop about one of said axes at a predetermined driving frequency, said one axis being at an angle to an axis about which angular momentum exists due to fluid flow in said loop to produce gyroscopic action, the mounting means for angular movement of the loop about the other of said axes including means providing a restoring moment, said loop, loop mounting and driving means being arranged as a substantially open-cycle system in which the displacement of the loop about said other axis as a function of driving frequency exhibits mechanical resonance, said predetermined driving frequency being low compared to the frequency of said mechanical resonance, and indicating means sensitive to gyroscopic couples of the loop about said other axis for indicating mass flow through the loop.

13. A mass flowmeter of the gyroscopic type which comprises a fluid conduit of loop form, means for leading fluid to and from said loop, means mounting said loop for angular movement about a first axis substantially in the plane of the loop and including means providing a restoring moment, means mounting said loop for angular movement about a second axis substantially perpendicular to said first axis, said axes substantially intersecting centrally of said loop, driving means of the substantially constant angular velocity type for oscillating said loop about said second axis at a predetermined driving frequency, said second axis being at an angle to an axis about which angular momentum exists due to fluid flow in said loop to produce gyroscopic action, said loop, loop munting and driving means being arranged as a substantially open-cycle system in which the displacement of the loop about said first axis as a function of driving frequency exhibits mechanical resonance, said predetermined driving frequency being low compared to the frequency of said mechanical resonance with the loop filled with fluid of density within a predetermined range, and indicating means sensitive to gyroscopic couples of the loop about said first axis for producing an output varying with mass flow through the loop.

14. A mass flowmeter of the gyroscopic type which comprises a fluid conduit of loop form, means for leading fluid to and from said loop, means mounting said loop for angular mvement about a first axis substantially in the plane of the loop and including means providing a restoring moment, means mounting said loop for angular movement about a second axis substantially perpendicular to said first axis, said axes substantially intersecting centrally of said loop, driving means of the substantially constant angular velocity type for oscillating said loop about said second axis at a predetermined driving frequency, said second axis being at an angle to an axis about which angular momentum exists due to fluid flow in said loop to produce gyroscopic action, said loop, loop mounting and driving means being arranged as a substantially open-cycle system in which the displacement of the loop about said first axis as a function of driving frequency exhibits mechanical resonance, said predetermined driving frequency being low compared to the frequency of said mechanical resonance with the loop filled with fluid of density within a predetermined range, transducer means of the velocity type connected with said loop to yield an output proportional to the angular velocity of the loop abut said first axis, and indicating means supplied from the output of said transducer means for indicating mass flow through the loop.

15. A mass flowmeter of the gyroscopic type which comprises a fluid conduit of loop form, means mounting said loop for angular movement about a first axis substantially in the plane of the loop and including means providing a restoring moment, means mounting said loop for angular movement about a second axis substantially perpendicular to said first axis, said axes substantially intersecting centrally of said loop, inlet and outlet fluid conduit sections extending from said loop to approximately the intersection of said axes, said conduit sections being substantially parallel to said first axis and arranged so that fluid flow in one section is in the opposite direction with respect to said intersection from fluid flow in the other section, driving means of the substantially constant angular velocity type for oscillating said loop about said second axis, said second axis being at an angle to an axis about which angular momentum exists due to fluid flow in said loop to produce gyroscopic action, the frequency of said oscillating being low compared to the resonant frequency of said loop about said first axis with the loop filled with fluid of density within a predetermined range, and indicating means sensitive to gyroscopic couples about said first axis for producing an indication varying with mass flow through the loop.

16. A mass flowmeter of the gyroscopic type which comprises a substantially circular fluid conduit loop, means mounting said loop for angular movement about a first axis along substantially a diameter of the loop and including means providing a restoring moment, means mounting said loop for angular movement about a second axis substantially perpendicular to said first axis, said axes intersecting at substantially the center of said loop, inlet and outlet fluid conduit sections extending to said loop from approximately the center thereof and substantially parallel to said first axis and closely adjacent thereto, the inner ends of said conduit sections having substantially right angle bends mutually perpendicular to said first and second axes and in opposite directions, flexible conduit connections to said right angle bends closely adjacent the center of said loop, driving means of the substantially constant angular velocity type for oscillating said loop about said second axis, said second axis being at an angle to an axis about which angular momentum exists due to fluid flow in said loop to produce gyroscopic action, the frequency of said oscillating being low compared to the resonant frequency of said loop about said first axis with the loop filled with fluid of density within a predetermined range, transducer means of the velocity type connected with said loop to yield an output proportional to the angular velocity of the loop about said first axis, and indicating means supplied from the output of said transducer means for indicating mass flow through the loop.

17. A mass flowmeter of the gyroscopic type which comprises a fluid conduit of loop form, means for leading fluid to and from said loop, means mounting said loop for angular movement about a first axis substantially in the plane of the loop and including means providing a restoring moment, means mounting said loop for angular movement about a second axis substantially perpendicular to said first axis and including means providing a restoring moment, driving means for oscillating said loop about one of said axes at a predetermined driving frequency, said loop, loop mounting and driving means being arranged as a substantially open-cycle system in which the displacement versus driving frequency characteristics of the loop about said axes exhibit mechanical resonances at different frequencies with the loop filled with fluid, the square of said driving frequency being approximately equal to the average of the squares of said different resonant frequencies, said one axis being at an angle to an axis about which angular momentum exists due to fluid flow in said loop to produce gyroscopic action, and indicating means sensitive to gyroscopic couples of said loop about the other of said axes for indicating mass flow through the loop.

18. A mass flowmeter of the gyroscopic type which comprises a fluid conduit of loop form, means for leading fluid to and from said loop, means mounting said loop for angular movement about a first axis substantially in the plane of the loop and including means providing a restoring moment, means mounting said loop for angular movement about a second axis substantially perpendicular to said first axis and including means providing a restoring moment, driving means of the substantially constant torque type for oscillating said loop about one of said axes at a frequency selected so that the square thereof is approximately equal to the average of the squares of the natural resonant frequencies of the loop about said axes with the loop filled with fluid of density within a predetermined range, said one axis being at an angle to an axis about which angular momentum exists due to fluid flow in said loop to produce gyroscopic action, indicating means sensitive to gyroscopic couples of said loop about the other of said axes for indicating mass flow through the loop, and damping means connected with said loop mounting means for substantially damping oscillations about said axes and thereby render the indication of mass flow substantially independent of fluid density over a predetermined range.

19. A mass flowmeter of the gyroscopic type which comprises a fluid conduit of loop form, means for leading fluid to and from said loop, means mounting said loop for angular movement about a first axis substantially in the plane of the loop and including means providing a restoring moment, means mounting said loop for angular movement about a second axis substantially perpendicular to said first axis and including means providing a restoring moment, driving means for oscillating said loop about one of said axes at a predetermined driving frequency, said loop, loop mounting and driving means being arranged as a substantially open-cycle system in which the displacement versus driving frequency characteristics of the loop about said axes exhibit mechanical resonances at different frequencies, said predetermined driving frequency being intermediate said different resonant frequencies, said one axis being at an angle to an axis about which angular momentum exists due to fluid flow in said loop to produce gyroscopic action, and indicating means sensitive to gyroscopic couples of said loop about the other of said axes.

20. A mass flowmeter of the gyroscopic type which comprises a fluid conduit of loop form, means for leading fluid to and from said loop, means mounting said loop for angular movement about a first axis substantially in the plane of the loop and including means providing a restoring moment, means mounting said loop for angular movement about a second axis substantially perpendicular to said first axis and including means providing a restoring moment, said axes substantially intersecting centrally of said loop, driving means of the substantially constant torque type for oscillating said loop about one of said axes at a predetermined driving frequency, said one axis being at an angle to an axis about which angular momentum exists due to fluid flow in said loop to produce gyroscopic action, the moments of inertia and restoring moments of said loop and mounting means about said axes being predetermined to yield displacement versus driving frequency characteristics exhibiting mechanical resonance at different frequencies with the loop filled with fluid, said predetermined driving frequency being intermediate said different resonant frequencies, and indicating means sensitive to gyroscopic couples of said loop about the other of said axes.

21. A mass flowmeter of the gyroscopic type which comprises a substantially circular fluid conduit loop, means for leading fluid to and from said loop, means mounting said loop for angular movement about a first axis along substantially a diameter of the loop and including means providing a restoring moment, means mounting said loop for angular movement about a second axis substantially perpendicular to said first axis and including means providing a restoring moment, said axes intersecting at substantially the center of said loop, driving means of the substantially constant torque type for oscillating said loop about said second axis at a predetermined driving frequency, said second axis being at an angle to an axis about which angular momentum exists due to fluid flow in said loop to produce gyroscopic action, the moments of inertia and restoring moments of said loop and mounting means about said axes being predetermined to yield displacement versus driving frequency characteristics exhibiting mechanical resonances at different frequencies with the loop filled with fluid, the square of said predetermined driving frequency being approximately equal to the average of the squares of said different resonant frequencies with fluid of density within a predetermined range, transducer means responsive to angular movement of said loop about said first axis, and indicating means supplied from the output of said transducer means for indicating mass flow through the loop.

22. A mass flowmeter of the gyroscopic type which comprises a substantially circular fluid conduit loop, means mounting said loop for angular movement about a first axis along substantially a diameter of the loop and including means providing a restoring moment, means mounting said loop for angular movement about a second axis substantially perpendicular to said first axis and including means providing a restoring moment, said axes intersecting at substantially the center of said loop, substantially parallel inlet and outlet fluid conduit sections extending from said loop to approximately the intersection of said axes and arranged so that fluid flow in one section is in the opposite direction with respect to said intersection from fluid flow in the other section, flexible conduit connections to said conduit sections near said intersection for leading fluid to and from said conduit sections, the moments of inertia and restoring moments of said loop and mounting means being predetermined to result in different natural resonant frequencies about said two axes with the conduit filled with fluid, driving means of the substantially constant torque type for oscillating said loop about said second axis, said second axis being at an angle to an axis about which angular momentum exists due to fluid flow in said loop to produce gyroscopic action, the frequency of oscillation being selected so that the square thereof is approximately equal to the average of the squares of said natural resonant frequencies with fluid of density within a predetermined range, transducer means responsive to angular movement of said loop about said first axis, and indicating means supplied from the output of said transducer means for indicating mass flow through the loop.

23. A mass flowmeter of the gyroscopic type which comprises a fluid conduit of loop form, means for leading fluid to and from said loop, means mounting said loop for angular movement about a first axis approximately in the plane of said loop, means mounting said loop for angular movement about a second axis approximately perpendicular to said first axis, driving means for oscillating said loop about one of said axes, said one axis being at an angle to an axis about which angular momentum exists due to fluid flow in said loop to produce gyroscopic action, transducer means of the velocity type connected with said loop to yield an output proportional to the angular velocity of the loop about the other of said axes, a peak detector circuit supplied with the output of said transducer means, and indicating means supplied from the output of said peak detector circuit for indicating mass flow through the loop.

24. A mass flowmeter of the gyroscopic type which comprises a fluid conduit of loop form, means for leading fluid to and from said loop, means mounting said loop for angular movement about a first axis substantially in the plane of the loop and including means providing a restoring moment, means mounting said loop for angular movement about a second axis substantially perpendicular to said first axis, said axes substantially intersecting centrally of said loop, driving means of the substantially constant angular velocity type for oscillating said loop about said second axis, said second axis being at an angle to an axis about which angular momentum exists due to fluid flow in said loop to produce gyroscopic action, the frequency of said oscillating being low compared to the resonant frequency of said loop about said first axis with the conduit filled with fluid of density within a predetermined range, transducer means of the velocity type connected with said loop to yield an output proportional to the angular velocity of the loop about said first axis, a peak detector circuit supplied with the output of said transducer means, and indicating means supplied from the output of said peak detector circuit for indicating mass flow through the loop.

25. A mass flowmeter of the gyroscopic type which comprises a substantially circular fluid conduit loop, means mounting said loop for angular movement about a first axis along substantially a diameter of the loop and including means providing a restoring moment, means mounting said loop for angular movement about a second axis substantially perpendicular to said first axis, said axes intersecting at substantially the center of said loop, inlet and outlet fluid conduit sections extending to said loop from approximately the center thereof and substantially parallel to said first axis and closely adjacent thereto, the inner ends of said conduit sections having substantially right angle bends mutually perpendicular to said first and second axes and in opposite directions, flexible conduit connections to said right angle bends closely adjacent the center of said loop, driving means of the substantially constant angular velocity type for oscillating said loop about said second axis, said second axis being at an angle to an axis about which angular momentum exists due to fluid flow in said loop to produce gyroscopic action, the frequency of said oscillating being low compared to the resonant frequency of said loop about said first axis with the conduit filled with fluid of density within a predetermined range, transducer means of the velocity type connected with said loop to yield an output proportional to the angular velocity of the loop about said first axis, a peak detector circuit supplied with the output of said transducer means, and indicating means supplied from the output of said peak detector circuit for indicating mass flow through the loop.

26. A mass flowmeter of the gyroscopic type which comprises a fluid conduit of loop form, means for leading fluid to and from said loop, means mounting said loop for angular movement about a first axis approximately in the plane of the loop, means mounting said loop for angular movement about a second axis approximately perpendicular to said first axis, driving means for oscillating said loop about one of said axes, said one axis being at an angle to an axis about which angular momentum exists due to fluid flow in said loop to produce gyroscopic action, a pickup transducer responsive to gyroscopic couples of said loop about the other of said axes, an amplifier supplied with the output of said transducer, a driving transducer connected with the output of said amplifier to produce a force between a pair of elements of the transducer, said driving transducer being mounted with one of said elements thereof fixed with respect to said loop at a position remote from said other axis and the other element thereof fixed against rotation about said other axis to thereby apply force to the loop, said amplifier being connected with said driving transducer in phase to produce a force opposing angular movement of the loop due to gyroscopic action of the flowing fluid therein, and indicating means varying with changes in the output of said amplifier for indicating mass flow through the loop.

27. A mass flowmeter of the gyroscopic type which comprises a fluid conduit of loop form, means for leading fluid to and from said loop, means mounting said loop for angular movement about a first axis approximately in the plane of the loop, means mounting said loop for angular movement about a second axis approximately perpendicular to said first axis, said axes substantially intersecting centrally of said loop, driving means for oscillating said loop about one of said axes, said one axis being at an angle to an axis about which angular momentum exists due to fluid flow in said loop to produce gyroscopic action, whereby a torque is developed about the other of said axes due to gyroscopic action with fluid flowing through the loop, a pickup transducer responsive to angular movement of said loop about the other of said axes, an amplifier supplied with the output of said transducer, a driving transducer connected with the output of said amplifier to produce a force between a pair of elements of the transducer, said driving transducer being mounted with one of said elements thereof fixed with respect to said loop at a position remote from said other axis and the other element thereof fixed against rotation about said other axis to thereby apply force to the loop, said amplifier being connected with said driving transducer in phase to produce a force opposing the torque due to said gyroscopic action, the gain of said amplifier being sufficiently large that the net torque on said loop is small compared to the torque due to said gyroscopic action, and indicating means varying with changes in the output of said amplifier for indicating mass flow through the loop.

28. A mass flowmeter of the gyroscopic type which comprises a fluid conduit of loop form, means for leading fluid to and from said lop, means mounting said loop for angular movement about a first axis approximately in the plane of the loop and including means providing a restoring moment, means mounting said loop for angular movement about a second axis approximately perpendicular to said first axis, said axes substantially intersecting centrally of said loop, driving means of the substantially constant angular velocity type for oscillating said loop about said second axis, said second axis being at an angle to an axis about which angular momentum exists due to fluid flow in said loop to produce gyroscopic action, whereby a torque is developed about said first axis due to gyroscopic action with fluid flowing through the loop, a pickup transducer responsive to angular movement of the loop about said first axis and yielding an electrical output which varies therewith, a substantially constant current amplifier supplied with the output of said transducer, a current actuated driving transducer connected with the output of said amplifier to produce a force between a pair of elements of the transducer, said driving transducer being mounted with one of said elements thereof fixed with respect to said loop at a position remote from said first axis and the other element thereof fixed against rotation about said first axis to thereby apply force to the loop, said amplifier being connected with said driving transducer in phase to produce a force opposing the torque due to said gyroscopic action, the gain of said amplifier being sufficiently large that the net torque on said loop is small compared to the torque due to said gyroscopic action, and indicating means responsive to changes in current output of said amplifier for indicating mass flow through the loop.

29. A mass flowmeter of the gyroscopic type which comprises a fluid conduit of loop form, means mounting said loop for angular movement about a first axis approximately in the plane of the loop and including means providing a restoring moment, means mounting said loop for angular movement about a second axis substantially perpendicular to said first axis, said axes substantially intersecting centrally of said loop, inlet and outlet fluid conduit sections extending to said loop from approximately the intersection of said axes and substantially parallel to said first axis and closely adjacent thereto, flexible conduit connections to said conduit sections near said intersection for leading fluid to and from said conduit sections, driving means of the substantially constant angular velocity type for oscillating said loop about said second axis, said second axis being at an angle to an axis about which angular momentum exists due to fluid flow in said loop whereby a torque is developed about said first axis by gyroscopic action, the frequency of said oscillating being low compared to the natural resonant frequency of said loop about said first axis in normal operation, a pickup transducer of the velocity type connected to said loop and responsive to the angular velocity of the loop about said first axis and yielding an electrical output which varies therewith, a substantially constant current amplifier supplied with the output of said transducer, a current actuated driving transducer mounted to apply a torque to the loop about said first axis, connections supplying the output of said amplifier to said driving transducer in such phase as to oppose the torque due to said gyroscopic action, the gain of said amplifier being sufficiently large that the net torque on said loop is small compared to the torque due to said gyroscopic action, and indicating means responsive to changes in current output of said amplifier for indicating mass flow through the loop.

30. A mass flowmeter of the gyroscopic type which comprises a fluid conduit of loop form, means mounting said loop for angular movement about an axis approximately in the plane of the loop and for angular movement about an axis approximately perpendicular to the first-mentioned axis, inlet and outlet fluid conduit sections for said loop arranged substantially parallel to one of said axes, driving means for oscillating said loop about the other of said axes, said other axis being at an angle to an axis about which angular momentum exists due to fluid flow in said loop to produce gyroscopic action, and indicating means sensitive to movement of said loop about said one axis.

References Cited in the file of this patent

UNITED STATES PATENTS 2,624,198   Pearson ---------------- Jan. 6, 1953